United States Patent [19]

Ohkita et al.

[11] Patent Number: 4,851,941
[45] Date of Patent: Jul. 25, 1989

[54] DISK DRIVE APPARATUS HAVING FINE ADJUSTMENT STRUCTURE FOR DISK PRESSING PAD

[75] Inventors: Masao Ohkita; Shinichi Omori, both of Furukawa, Japan

[73] Assignee: Alps Electric Co., Ltd., Japan

[21] Appl. No.: 19,037

[22] Filed: Feb. 26, 1987

[30] Foreign Application Priority Data

Jul. 10, 1986 [JP] Japan .................................. 61-104948

[51] Int. Cl.⁴ ............................................ G11B 5/012
[52] U.S. Cl. ............................... 360/97.01; 360/130.3; 360/133
[58] Field of Search ............... 360/97, 104, 133, 130.3

[56] References Cited

U.S. PATENT DOCUMENTS 4,392,165  7/1983  Wright ............................. 360/104 X
4,549,239 10/1985  Kawajiri ............................. 360/105

Primary Examiner—John H. Wolff
Attorney, Agent, or Firm—Guy W. Shoup; Paul J. Winters; Leighton K. Chong

[57] ABSTRACT

Disclosed is a disk drive apparatus in which relative positional relation of head and recording medium is optimized in order to assure the best condition for the recording and replay of picture. Namely, the height of pad can be changed so that the relative positional relation of recording medium surface and head can be optimized by the adjusting screws provided to the fulcrum point of pad and accordingly satisfactory condition of contact between the head and recording medium surface can be assured.

2 Claims, 9 Drawing Sheets

DISK DRIVE APPARATUS HAVING FINE ADJUSTMENT STRUCTURE FOR DISK PRESSING PAD

FIELD OF THE INVENTION

The present invention relates to a disk drive apparatus and particularly to a disk drive apparatus which is preferably suited to drive of still video floppy disk.

BACKGROUND OF THE INVENTION

An example of a disk drive apparatus for recording or/and replaying a still video signal has been disclosed in the Japanese published unexamined patent application with laid-open No. 57677/1983. This disk drive apparatus provides a structure that a cassette holder is pivotally supported at its one end with capability of swaying to a fitting substrate providing a rotating base and after a magnetic sheet jacket (hereinafter referred to as a disk cartridge) is inserted into said cassette holder, said holder is rotated to the side of fitting substrate, loading the disk cartridge on the rotating base. During the loading, as indicated in FIG. 18, a regulating plate 119 which regulates height of information recording medium 120 (hereinafter referred to as a disk) for a magnetic head 158 enters the disk cartridge 121, regulating a clearance between the magnetic head and disk 120 and giving a predetermined loading pressure. This regulating plate 119 is adustably provided in the side of a lid (case cover 118 in the prior art), and the holder is pivotally supported by said case cover 118 with capability of a certain swaying. Therefore, when the case cover 118 is opened, the holder is a little separated from the case cover 118 and said regulating plate 119 is located at the outside of case of disk cartridge 121. Thereby, when the case cover 118 is opened, the disk cartridge 121 can be freely inserted or removed.

Said disk drive apparatus is called a top-loading system wherein the opening and closing operations of the lid (case cover 118 in above example) provided with the holder of disk cartridge correspond to the eject operation and loading operation of disk cartridge. In case the front loading system is employed considering operationability and space factor, it is necessary that the regulating plate 119 is capable of going into or back from the holder in accordance with loading or unloading of disk cartridge 121. As the going and returning operations of this regulating plate 119, combination of caridge and hold case rotatably supported by the end part of cartridge, for example, which is widely employed for the drive apparatus of flexible magnetic disk, is known. In this combination, however, the coupling part of cartridge and hold case is protruded to the side portion of holder and the space, in which said coupling part can move as much as the stroke for at least the magnetic head to move in the recording region, is required, resulting in the limit for reduction in size.

In order to complete this problem, a front loading type disk drive apparatus has been proposed by the Japanese utility model application No. 036317/1985.

Figure 7:
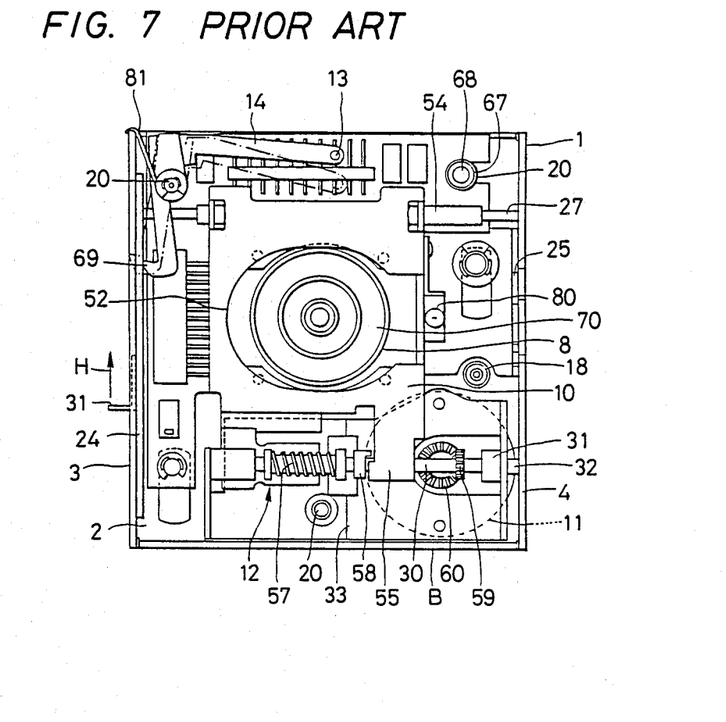
FIG. 7 represents a plan view indicating a disk drive apparatus of the prior art.
Figure 8:
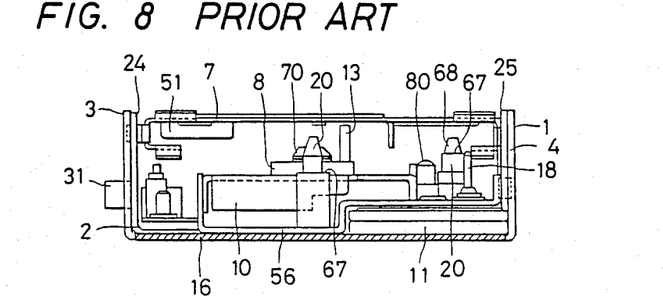
FIG. 8 represents a front elevation of an apparatus of FIG. 7.
Figure 9:
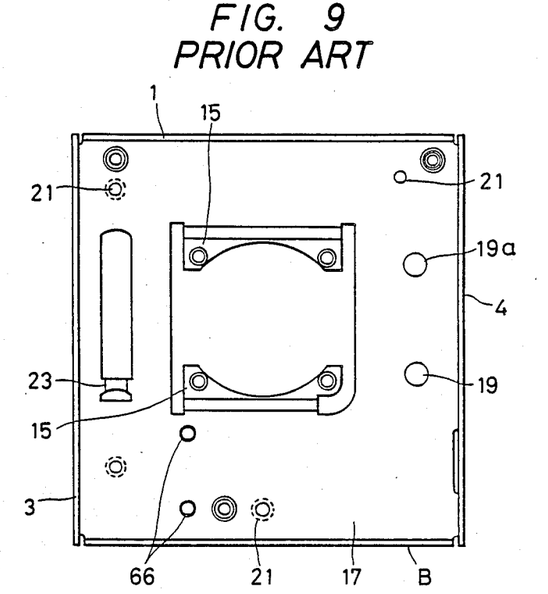
FIG. 9 is represents a plan view of a frame in FIG. 7.

This disk, as indicated in FIG. 7 to FIG. 17, mainly comprises a frame 1, a slide plate 2 which can slide in the vertical direction of FIG. 7 at the upper surface of frame 1, a cartridge holder (hereinafter called a holder) 7 which is provided with projections 6a, 6b engaging respectively with the cam grooves 5a, 5b formed at the side plates 24, 25 of the slide plate 2 adjacent to the side plates 3, 4 of frame 1 respectively at the side surfaces and holds the disk cartridge 50, a motor 9 which is provided at the upper surface of frame 1, rotates a turntable 8 and forms a disk drive mechanism with the turntable 8, a caridge 10 which is provided at the surface of frame 1 and can be transferred in the radius direction of disk, a caridge transfer mechanism 12 which transfers said caridge with a stepping motor 11, and a lock lever 14 which is provided with an operation pin 13 which is erected at the deepest part in the inserting direction of cartridge 50 and is regulating the slide position of the slide plate 2.

The frame 1 is set to the size near the external size of disk cartridge 50 by bending a metal plate material and the motor fitting part 15 is also formed thereto at the center thereof with a part lifted from the bottom plate 16. The fitting part 17 of the caridge transfer unit 29 which will be described subsequently is provided and the two fitting holes 19 of the pad adjusting pin 18 as the height adjusting means of pad 41 at the end part of cam plate 42 as the regulating member are bored to the disk cartridge inserting side B of the frame 1. Moreover, the fitting part 21 of positioning pin 20 which supports the disk cartridge 50 at the time of loading is provided at three points in total, one is in the disk cartridge inserting side B and other two are respectively in the corners opposed to the disk cartridge inserting side, and the fitting part 23 of a tensile spring 22 which always presses the slide plate 2 in the disk cartridge inserting side B is also provided.

The side plates 3, 4 are formed erecting in both sides of the frame 1, the left side plate 3 viewed from the disk cartridge inserting side B is provided with two guides grooves 26a which guide the end portions of protections 5a which will be described subsequently, while a fitting hole 28 of guide shaft is formed in the side opposed to the disk cartridge inserting side. Meanwhile, the right side plate 4 viewed from the disk cartridge inserting side B is provided with the guide 26 which is the same as that described above and allows insertion of the projection 32 of a bearing 31 of screw shaft of the caridge transfer unit 29.

Figure 10:
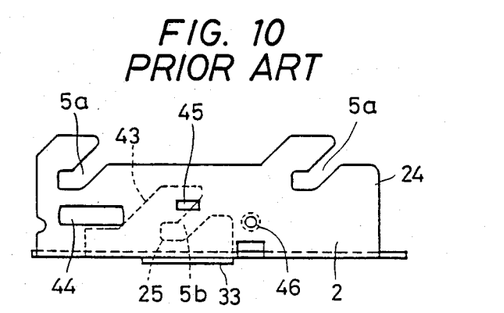
FIG. 10 is a side elevation in FIG. 7.

A recessed part 33 is formed at the bottom part of the slide plate 2, and this recessed part 33 is located at the lower surface of motor fitting part 15 of said bottom plate 16 and slides within the range of said fitting part 15. The side plates 24, 25 are respectively provided with the cam grooves 5a, 5b to which projections 6a, 6b projected in the side of the holder 7 are inserted. In addition, the cam surface 43 of the reciprocal cam which causes the cam plate 42 to go up and down and is provided as the regulating member which is described later and provides a pad 41 is formed in the side opposed to the disk cartridge inserting side of the right side plate B viewed from the disk cartridge nesting side B. The large and small openings shown in FIG. 10 are respectively an insertion hole 44 to which the guide shaft 27 is inserted and an engaging hole 45 with which the end face of lock lever 32 engages, and said eject lever 31 is fitted to the fitting hole 46 formed in the same side.

Figure 15:
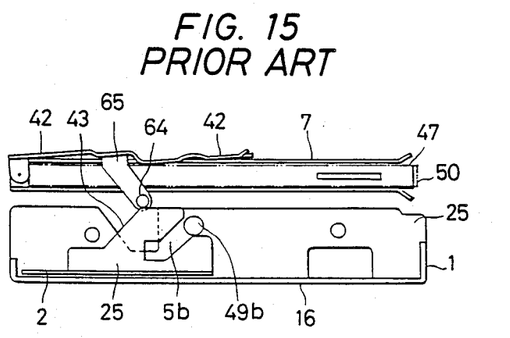

As shown in FIG. 15, the holder 7 is provided with an insertion hole 47 of disk cartridge 50 at the lower side.

The left side surface of holder 7 is provided with two projections 6a, an elastic segment 48 is integrally extended in perpendicular from the right side surface and the end face of this elastic segment 48 is provided with a projection 6b. These projections 6a, 6b move along the cam grooves 5a, 5b in the embodiment of the present invention and therefore the drive rollers 49a, 49b are respectively provided rotatably at the inner side. The latest end of the holder viewed from the disk cartridge insertion port 47 is provided with a stopper 51 which regulates the inserting position of the disk cartridge 50. The main table side 8 of holder 7 is opened almost entirely and the support segment 53 formed at the lower side of said side surface supports the disk cartridge 50.

As shown in FIG. 7, the caridge 10 has a turntable insertion hole 52 to which the turntable 8 is rotatably inserted, a bearing 54 of a long span is loaded to the upper part thereof and metals are respectively set with both ends of said bearing 54.

The lower part of caridge 10 is pressurized in contact with the screw shaft 30 of caridge transfer mechanism 12 from the holder side 7 and is also provided with a contact segment 55 which regulates the height of caridge 10.

The caridge transfer unit 33 provided as the caridge transfer mechanism mainly comprises a support plate 56, a stepping motor 11 and a screw shaft 30. The support plate 56 is bent in two stages as is apparent from FIG. 8 and the stepping motor 11 is provided between said support plate 56 and the bottom plate 16.

An intermittent drive screw 57 engraved to the screw shaft 30 is set so that the axial running pitch in accordance with a range of preset rotating angle corresponds to the width of recording track of disk. Moreover, this screw shaft 30 is set with a stopper 58 and a flat gear 59. The stopper 58 regulates rotation of the screw shaft 30 with the protruded portion thereof engaged with the projection of said contact segment 55, thereby rejecting transfer of caridge 10. The stop position corresponds to the track position of magnetic head 59.

The flat gear 59 set to the screw shaft 30 engages with a crown gear 60 set to the rotating shaft of the stepping motor 11. The step operation of stepping motor 11 is transmitted to the screw shaft 30 via the crown gear 60 and flat gear 58. Thereby, rotating operation of stepping motor 11 is transmitted to the caridge 10 via said intermittent drive screw 57 in order to make the caridge 10 advance in straight in each step.

Figure 11:
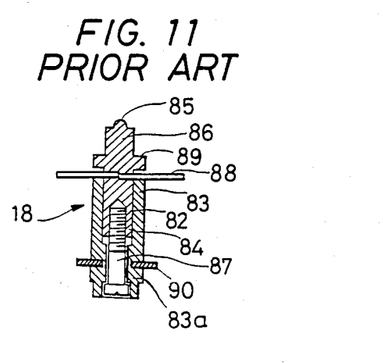
FIG. 11 represents a sectional view of pad adjusting pin 18 in FIG. 7.
Figure 12:
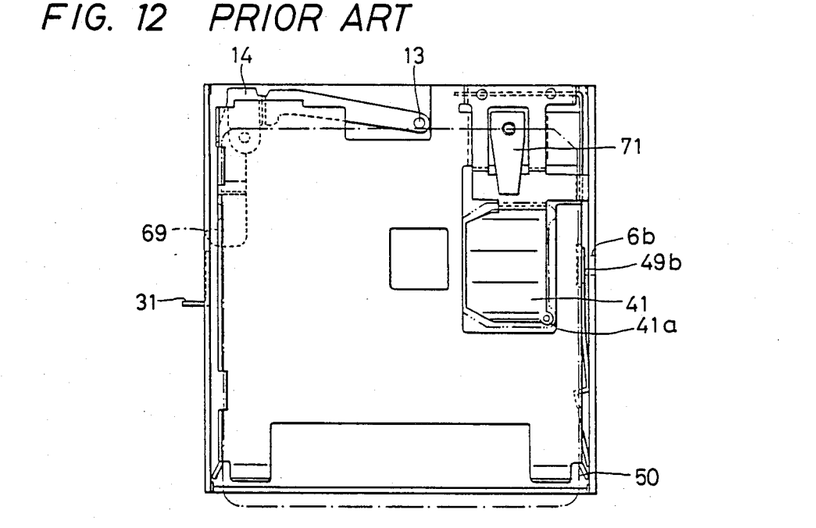
FIG. 12 and FIG. 13 represent plan views indicating the cam plate in FIG. 7.

A pad adjusting pin 18 is erected as an adjusting means and the end part thereof is protruded from the pad insertion port of holder 7 in the disk cartridge insertion side B in such a degree as regulating the height of pad 41 provided to the end part of cam plate 42 described later for the magnetic head. The pad 41 regulates relative height of the disk and magnetic head 80 by regulating the height for the magnetic head 80. The pad adjusting pin 18 is mainly composed, as shown in FIG. 11, of a support pin 83 forming a through hole 82 at the lower part of center, an adjusting pin 86 where the female screw 84 is cut at the lower part of center and the contact part 85 is formed at the upper part, and an adjusting screw 87 which is inserted from the lower end of the through hole 82 of support pin 83 and engages with the female screw 84 of said adjusting pin 86. A spring washer 88 is inserted as an elastic member between the adjusting pin 86 and the support pin 83 and fine adjustment is possible within the range where an elastic force of spring washer 88 is effective by rotating the adjusting screw 87. Therefore, a collar 89 is formed to the adjusting pin 86 and said through hole 82 of the support pin 83 is provided with a stepped portion 83a with which the head adjusting screw 87 is pressurized in contact.

This pad adjusting pin 18 is inserted to a fitting hole 19 from the upper surface of bottom plate 16 and is fitted by caulking the lower end of support pin 83 to the outside.

The cam plate 41 is provided with a pad 42 in the side of end part and at the upper part thereof, a roller 64 which rotatably moves on the cam surface 43 of the reciprocal cam formed to the side plate 29 of slide plate 2 is projected at the lower end of the side plate 65 extended perpendicularly and said pad 42 and roller 4 form a device having the function as the cam follower. In addition, a positioning hole 41a is bored to the area of pad 42 opposed to said pad adjusting pin 18 and said contact part 85 engages with said hole during the loading of holder, thereby regulating the height of pad 42 for the magnetic head 59. During the unloading of holder 7, this cam plate 41 goes back from the case of holder 7 as shown in FIG. 15 with the pad 4 located at the upper part of holder 7. During the loading of holder 7, the cam plate 41 is located within the holder 7, pressing the disk surface. Thereby, the cam plate functions as a regulating member.

The caridge transfer unit 33 is fitted to the unit fitting hole 66 of bottom plate 16 by screwing. In this case, the protruded part 32 of bearing 31 is inserted into the fitting hole of side plate 4 of frame 1 and the bearing 31 is fixed to the frame 1 at the three points in total of said fitting hole and two unit fitting holes 66.

The caridge 10 is supported between the guide shaft fixed between both side plates 3, 4 and screw shaft 30 of caridge transfer unit 33 and thereby reciprocally moves to the right and left, owing to the structure described above.

The positioning pin 20 provides a placing part 67 and inserting part 68. Said inserting part 68 is inserted to the positioning pin inserting port formed to the case of said disk cartridge 50, and the lower surface of case is placed in contact with said placing part 67 for the positioning of case.

The loading operation of disk drive apparatus constituted as explained above will then be described subsequently.

Figure 16:
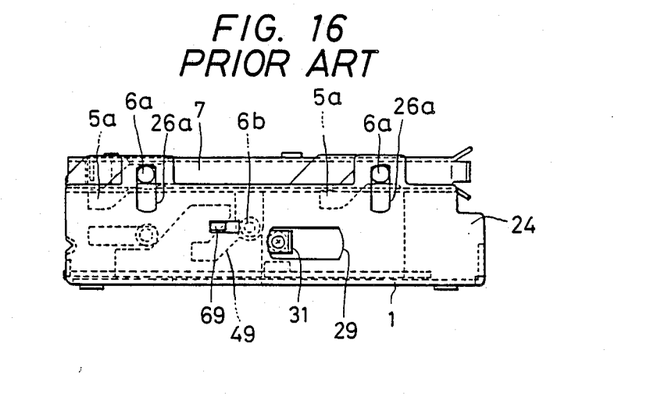

Before the disk cartridge 50 is inserted to the holder 7, the holder 7 is located furthest from the turntable 8, for example, as shown in FIG. 15 and FIG. 16 and in this case projections 6a, 6b of holder 7 are respectively located at the highest part of guide grooves 26a, 26b and are also located at the horizontal part at the upper end of cam grooves. Under this condition, the projection 69 of the lock lever 14 engages with the edge of engaging hole 45 of the slide plate 2, holding the slide plate 2 in the deepest position for the disk cartridge inserting side B.

Figure 13:
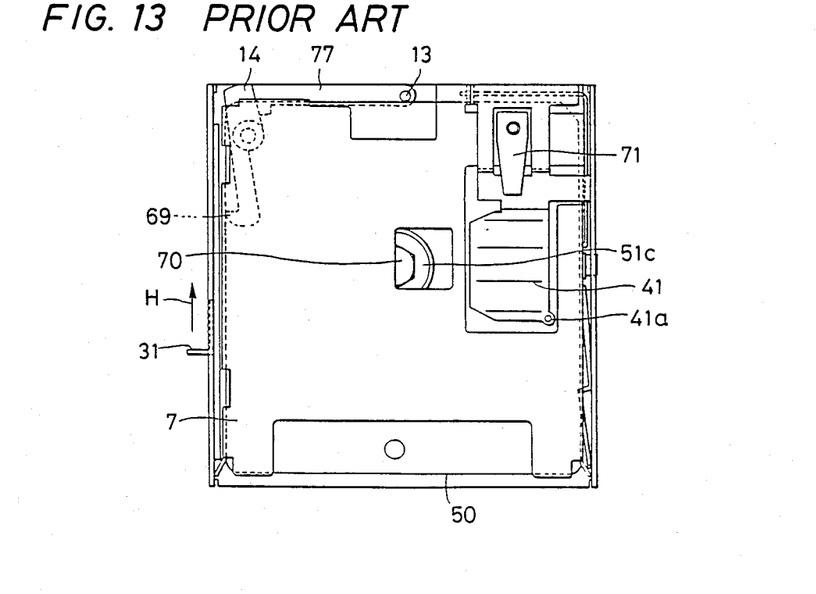
Figure 14:
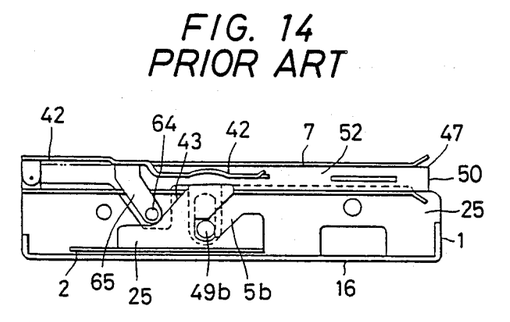
FIGS. 14 to FIG. 17 represent side elevations indicating operations of cam plate in FIG. 7.
Figure 17:
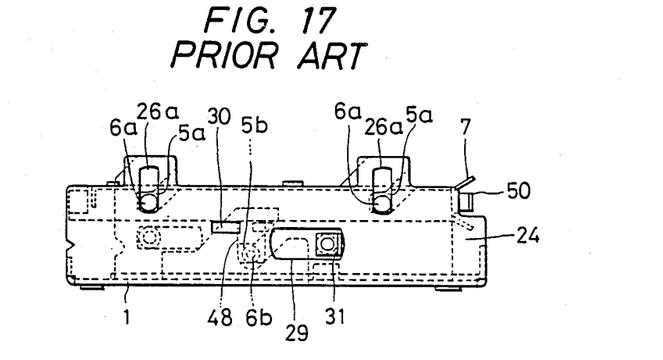

When the disk cartridge 50 is inserted into the holder 7 from said waiting condition, the end part of case is placed in contact with an operation pin 13 of the lock lever 14. When it is further inserted, the lock lever 14 rotates counterclockwise as shown in FIG. 13, resetting the engagement between the projection 69 and the edge of engaging hole 45 of the slide plate 2. In this timing, the slide plate 2 slides to the disk cartridge inserting side B with an elastic force of the tensile spring 22 which is always activated in said disk cartridge inserting side B. Thereby, as shown in FIG. 14 and FIG. 17, the rollers 56a, 56b of the projections 6a, 6b are displaced along the cam grooves 5a, 5b and the projections 6a, 6b are inserted to the guide grooves 26a, 26b of frame 1. Therefore, displacement by the cam grooves 5a, 5b is converted to the movement perpendicular to the direction of turntable 8. The drop position of disk cartridge 50 is regulated by the height of placing part 67 of said positioning pin 20 and the case can no longer drop exceeding such drop position. During this downward movement, when the shaft inserting hole 51 of a hub 51c of disk cartridge 50 is engaged with said fixed shaft (spindle shaft) 70 and is located to the lowest position, it is certainly engaged with pressure to the rotating part inserted with said fixed shaft 70.

With such loading operation, said roller 64 moves along the cam surface 43 and the pad 42 is located within the holder 7, and finally the cam plate 41 is pressurized in contact with the disk surface and necessary loading pressure can be obtained by a plate spring 71 provided separately.

Next eject operations are explained hereinafter.

When the disk is loaded as explained above and recording or replay is completed, the disk is protruded from an opening 29 of side plate 3 of the frame 1, and the eject lever 31 which is located in the disk cartridge inserting side B is slid in the side opposed to the disk cartridge inserting side, namely in the direction of arrow mark H of FIG. 13. Such sliding operation causes the slide plate 2 to return in the H direction. When said engaging hole 45 bored to the slide plate 2 is located to the position corresponding to the projection 69 of lock lever 14, the lock lever 14 rotates clockwise with an elastic force of the spring 81 and engages wit the edge of hole 45 from the projection 69. During this operation, the holder 7 rises along said cam holes 5a, 5b and the hub 51c of disk separates from the turntable 8. When the lock lever 14 rotates as explained, the operation pin 13 exhausts the end part of case in the disk cartridge inserting side B with an elastic force of the spring 81. During this process, the cam plate 41 rotates counterclockwise up to the position indicated in FIG. 15 from the position of FIG. 14, since the roller 64 rises along the cam surface 43 and the pad 42 separates from the disk surface and returns to the upper surface of holder 7, eject operation can be carried out smoothly. This returning operation makes free the loading and unloading of the disk cartridge 50.

However, the conventional disk drive apparatus realizes reduction in size by employing the front loading system but does not result in good positional relation between the head surface and recording medium because the contact condition between the head surface and recording medium surface is uniquely determined by the pressing condition of the pad 42.

SUMMARY OF THE INVENTION

The present invention is proposed considering the background of the prior art described above and it is accordingly an object of the present invention to provide a disk drive apparatus which assures optimum relative positional relation between the head and recording medium and also satisfactory recording and replay of picture.

In view of solving such problem mentioned above, the present invention discloses a disk drive apparatus comprising a disk holder which holds a disk cartridge housing a disk type information recording medium within a case, a slide plate which moves upward or downward said cartridge holder for the turntable which rotatably drives information recording medium, a head which writes or reads signals to/from information recording medium and a pad which causes said information recording medium to come close to said head, wherein further comprising a support mechanism which realizes vertical movement of the fulcrum point of said pad and a pair of adjuting screws which are provided to said mechanism and adjust inclination and height of the fulcrum point of said pad.

According to the means explained above, a disk drive apparatus which assures good contact condition between the head and recording medium surface can be constituted because height of pad can be changed so that the relative position between recording medium surface and head surface can be optimized by the adjusting screws provided to the fulcrum point of pad.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be understood, however, that the drawings are for the purpose of illustration and description only and are not intended as a definition of the limits of the invention.

DETAILED DESCRIPTION OF THE INVENTION

A preferred embodiment of the present invention will then be explained with reference to the accompanying drawings. The invention is intended to be used in a disk cartridge drive unit similar to that of the prior art described with respect to FIGS. 7-7. It provides an improvement to the pad holding and adjusting structure 18, 41 for the disk pressing pad 42 shown in FIGS. 12-15 thereof. To the extent the intended environment of use is similar, the description thereof is not repeated below.

Figure 1:
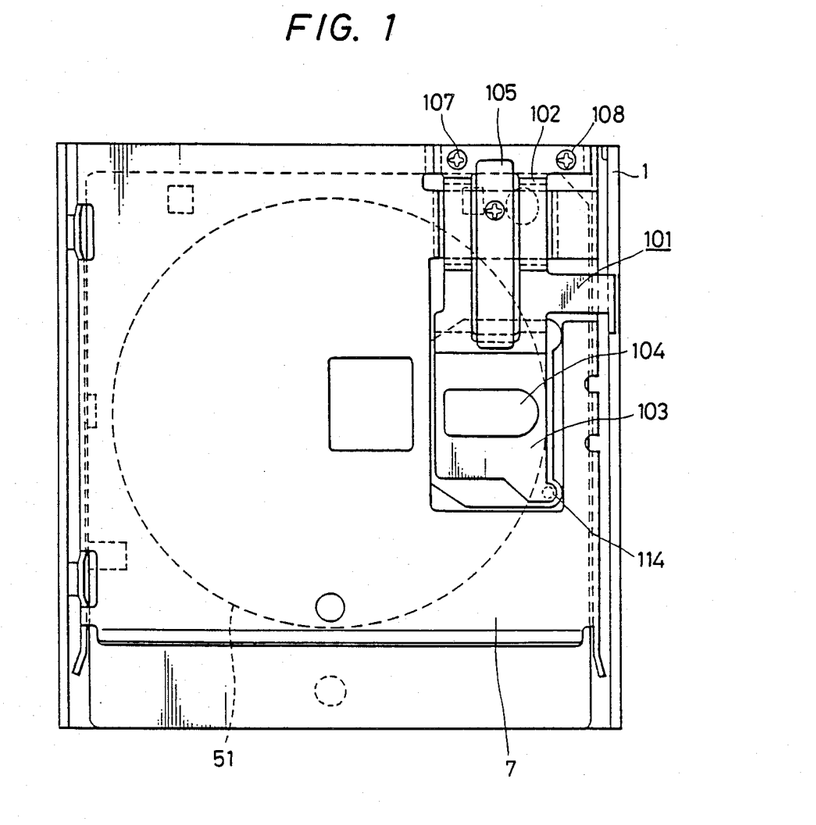
FIG. 1 represents a plan view of an embodiment to which the present invention pertains.
Figure 2:
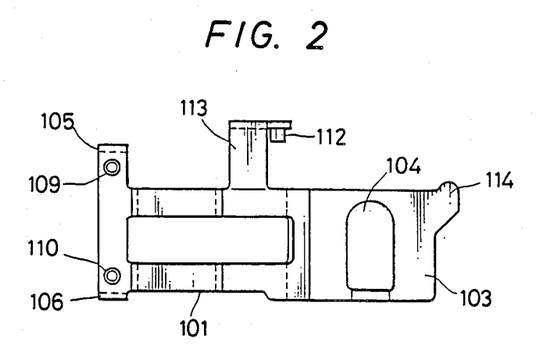
FIG. 2 and FIG. 3 represent a plan view and front elevation of a cam plate to which the present invention pertains.
Figure 3:
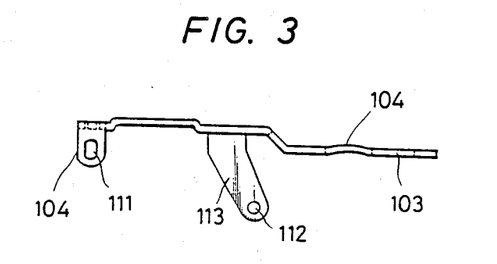

As shown in FIG. 1, the cam plate 101 is supported by the frame 1 via the shaft 102 at the head mounting position of said frame 1. The end part of cam plate 101 forms a pad 103 and an opening 104 is also formed to the head position of said pad 103. The fulcrum point of cam plate 101 provides the side plates 105, 106 as shown in FIG. 2 and FIG. 3, allowing insertion of the shaft 102.

Moreover, at the upper part of fulcrum point, the threaded holes 109 and 110 with which the adjusting screws 107 and 108 are engaged are provided.

Each side plate 105 or 106 is respectively formed with an elongated hole 111 perpendicularly so that the shaft 102 is allowed to be inserted and adjustment for height of cam plate 101 and pad 103 is possible. In addition, At side of cam plate 101, a side plate 113 loading the roller 112 which rotates on the cam surface 43 shown in FIG. 14 and FIG. 15 is provided. Moreover, a positioning segment 114 to be in contact with the top of the pin 18 shown in FIG. 11 is provided at the end part of pad 103.

Figure 4:
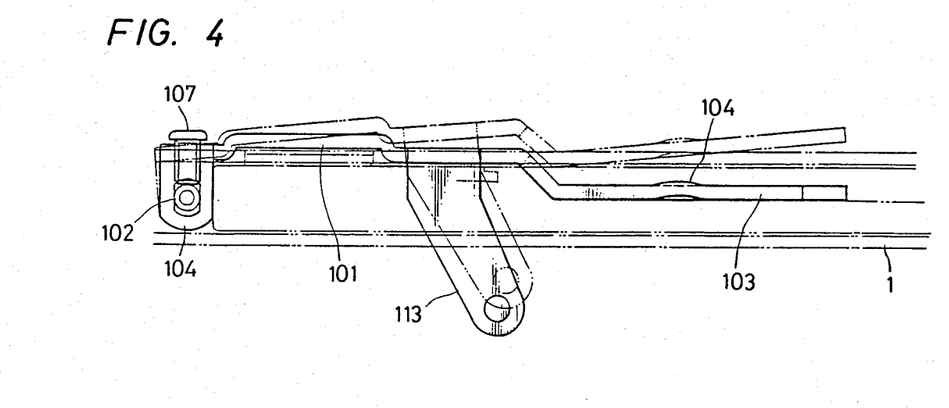
FIG. 4 is a pictorial presentation for explaining operations of the cam plate.
Figure 5:
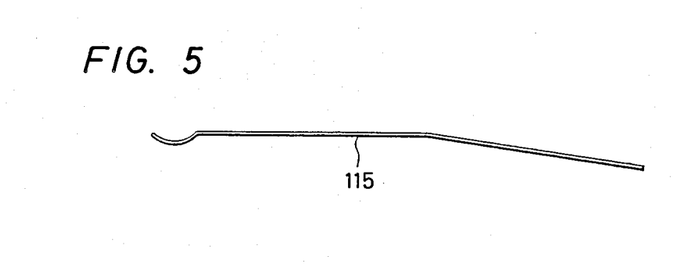
FIG. 5; represents a front elevation of a pad spring.

The cam plate 101 is located at the position indicated by a chain line of FIG. 4 before the disk cartridge 50 is loaded and it is located at the position indicated by a solid line when the disk cartridge 50 is inserted and set into the holder. At the upper surface of cam plate 101, a plate spring 115 shown in FIG. 5 is arranged and always presses the cam plate 101 toward the turntable 8. The cam plate 101 can be shifted within the range of elongated hole 111 by changing amount of screwing of the adjusting screws 107, 108.

Next, a method for fine adjustment of pad 103 in the height and radial direction will be explained with reference to FIG. 6.

FIG. 6(a) shows the ordinary condition which is the target condition in the design step, wherein the amount of screwing of adjusting screws 107 and 108 is adjusted so that the shaft 102 is located at the center of elongated hole 111.

FIG. 6(b) shows the condition where the adjusting screws 107 and 108 are adjusted so that the shaft 102 is located at the bottom part of elongated hole 111. Thereby, both right and left fulcrums of pad 103 are lifted, namely the inner side is raised against the recording medium.

FIG. 6(c) shows the condition where the adjusting screws 107, 108 are adjusted so that the shaft 102 is in contact with the upper part of the elongated hole 111. The fulcrum point of pad 103 is lowered in the inner side against the recording medium.

FIG. 6(d) shows the condition where amount of screwing of adjusting screw 108 is increased and that of adjusting screw 107 is reduced and thereby the outer side is lifted for the recording medium and the inner side is lowered.

Figure 6:
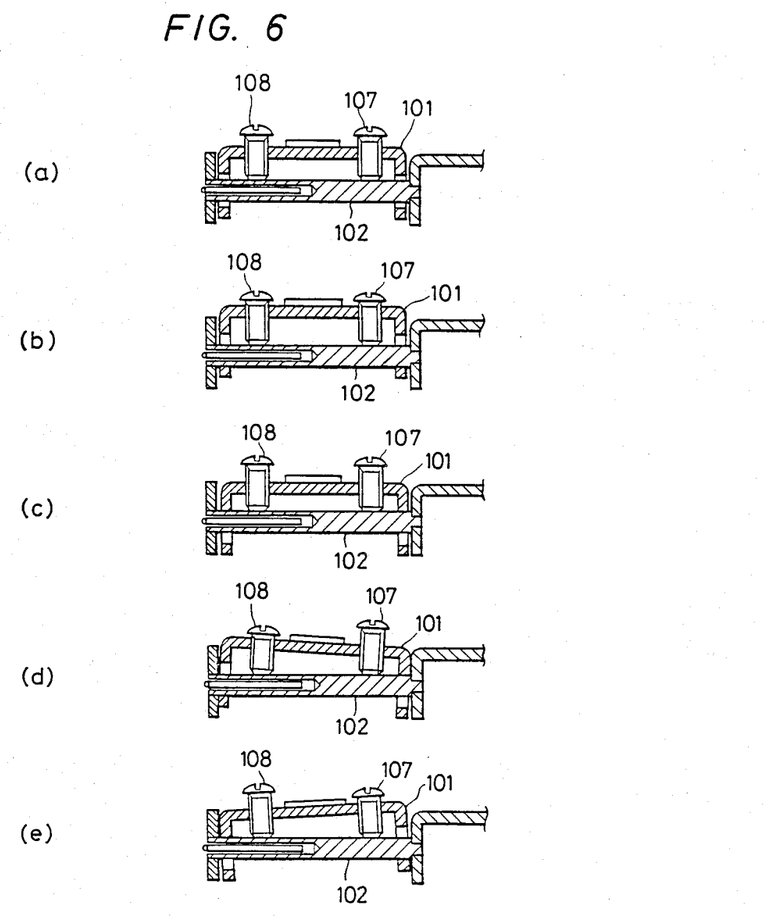
FIGS. 6(a)~(e) are pictorial presentation for explaining pad adjustment in the present invention.

FIG. 6(e) shows the condition where the adjusting screws are adjusted reversely to the adjusting in FIG. 6 (d), thereby the inner side is lifted for the recording medium and the outer side is lowered.

In any adjustment described above, it can be seen that a recorded disk cartridge 50 for monitoring is loaded and the adjusting screws 107, 108 are adjusted until the best condition can be obtained while observing the replayed picture on the monitor television, etc.

Adjustment for clearance between the recording medium and head 80 can be realized by vertically moving the recessed part 104 through adjustment of the pin 18.

In above embodiment, the protruded part 114 is provided to the deflected part of recording medium but it may be an opening.

As described above, according to the present invention, the best condition for recording and replay which assures optimum adjustment of the clearance between the head and recording medium can be obtained because rise and fall of the fulcrum point and the parallelism in the radial direction for disk can be adjusted by two adjusting screws.

What is claimed is:

1. In a disk drive apparatus of the type wherein a cartridge containing a disk is inserted in a cartridge holder movably mounted in a frame, the cartridge holder is then moved to a loading position to bring the disk to a horizontal plane on a rotatable drive, a magnetic head is disposed in contact with a disk surface on one side of the disk through a window in the cartridge, the magnetic head is moved horizontally in one radial direction of the one surface of disk to reproduce information stored thereon as the disk is rotated on the drive, and a pad is held by a cam plate adjustably mounted on the frame adjacent one side of the cartridge holder and is pressed biasingly in contact with an opposite side of the disk at a position opposite from the magnetic head so as to regulate the height of the disk in operative contact relation to the magnetic head, the improvement wherein:
said cam plate is formed by a mounting portion adjustably mounted to the frame and disposed in a transverse direction from said magnetic head which is perpendicular to said radial direction of movement of said magnetic head, said mounting portion having a certain length extending in parallel to said radial direction, a pair of legs extending perpendicularly from said mounting portion in said transverse direction such that respective end portions thereof are disposed in opposed relation to said magnetic head on the opposite side of the disk therefrom, said legs being spaced apart from each other along the length of said mounting portion, and a pad mounted to said end portions of said legs for pressing the disk in said horizontal plane and regulating its height relative to said magnetic head, wherein said mounting portion, pair of legs, and pad of said cam plate substantially form a parallelogram relative to said horizontal plane, and said mounting portion serves as a fulcrum position for said cam plate and said pad relative to said magnetic head; and
adjustable mounting means for adjustably mounting said mounting portion to the frame so as to adjust the vertical fulcrum position of said mounting portion and, correspondingly, said cam plate and said pad, as well as inclination of said parallelogram cam plate relative to said horizontal plane.

2. A disk drive apparatus of claim 1, wherein said mounting means includes a shaft fixed to the frame and extending horizontally in parallel to said radial direction, a pair of side plates extending from opposite ends of said mounting portion downward in a vertical direction and each having an elongated opening through which said shaft is disposed so as to retain said mounting portion on said shaft but allow adjustable vertical movement of said mounting portion relative to said shaft, a pair of threaded holes formed in said mounting portion spaced apart along the length thereof, and a pair of adjusting screws threaded in said holes and extending downward therefrom with their respective ends in abutting contact with said shaft, wherein each of said adjusting screws can be threadably adjusted in their respective holes.

* * * * *